INVENTOR.
BERNARD A. SHOOR
BY
ATTORNEY

INVENTOR.
BERNARD A. SHOOR
BY
*[signature]*
ATTORNEY

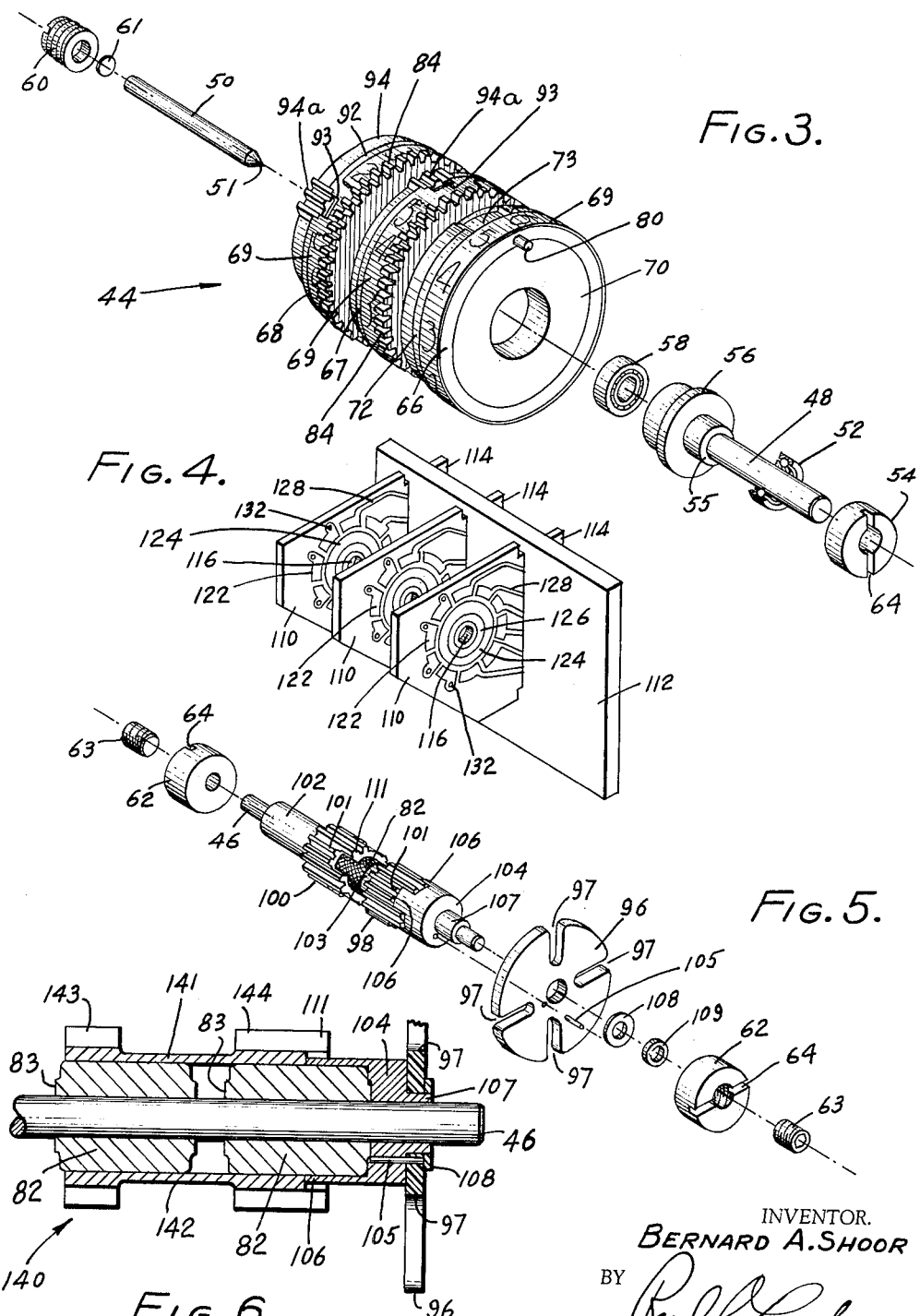

Aug. 24, 1965  B. A. SHOOR  3,202,802
COUNTING AND SWITCHING UNIT
Filed May 20, 1957  5 Sheets-Sheet 4

INVENTOR.
BERNARD A. SHOOR
BY
ATTORNEY

Aug. 24, 1965  B. A. SHOOR  3,202,802
COUNTING AND SWITCHING UNIT
Filed May 20, 1957  5 Sheets-Sheet 5

INVENTOR.
BERNARD A. SHOOR
BY
Red Lawler
ATTORNEY 3,202,802
COUNTING AND SWITCHING UNIT
Bernard A. Shoor, Pasadena, Calif., assignor, by mesne assignments, to H. Dudley Wright, Altadena, Calif.
Filed May 20, 1957, Ser. No. 660,285
7 Claims. (Cl. 235—92)

The present invention relates generally to indicating and telemetering devices, and more particularly to a high speed rotary telemetering counter adapted to produce simultaneously visible and electrical indications of a digital numerical quantity.

Devices of this general character have been known and used in the past but have been limited in their speed of response by comparatively cumbersome switching arrangements, poor mechanical construction not adapted to high speeds, and rapid wear under forced high speed conditions which soon resulted in inaccuracies of proper counting and failure of the telemetering components. Other disadvantages found in such telemetering devices were due to their weight, size, and relative inability to retain their precision adjustments, particularly under high speed operating conditions.

An object of the invention, therefore, is to provide a telemetering counter which is so constructed as to retain its accuracy under high speed operating conditions.

Another objet of the invention is to provide means for adjusting the various parts with relation to each other so as to insure precise and accurate operation at all times.

A further object of the invention is to provide a mechanical input actuation that is substantially shockless under high speed operating conditions.

A still further object of the invention is to provide means for accomplishing the telemetering functions without the necessity of introducing the telemetering currents by means of brushes riding on slip rings or other current collecting devices attached to the various counters, thereby conserving weight and space as well as eliminating one source of inaccuracy.

Another object of the invention is to utilize printed circuits in the formulation of the telemetering contacts, also thereby conserving weight and space.

Further objects and advantages of the invention will be more fully understood and appreciated from the following detailed description and the accompanying drawings wherein like reference characters denote like parts throughout the several views and in which:

FIG. 3 is an exploded perspective view of the counter assembly;

FIG. 4 is a perspective view of the printed circuit board assembly;

FIG. 5 is an exploded perspective view of the intermittent transfer gear assembly;

FIG. 6 is a cross-sectional view of the Geneva wheel conversion unit;

Generally speaking, the invention is carried out by use of a plurality of counter elements, each having a counter wheel adapted to be rotated by external actuation. The counter elements are mechanically interconnected so that a complete rotation of a counter wheel rotates the counter wheel of the next succeeding, or higher order, counter element by a certain specified designed or predetermined fraction of a revolution, in this case, one-tenth of a revolution. Telemetering circuit means are provided in connection with each counter wheel so as to vary the circuit conditions as the counter wheels are turned.

Figure 1:
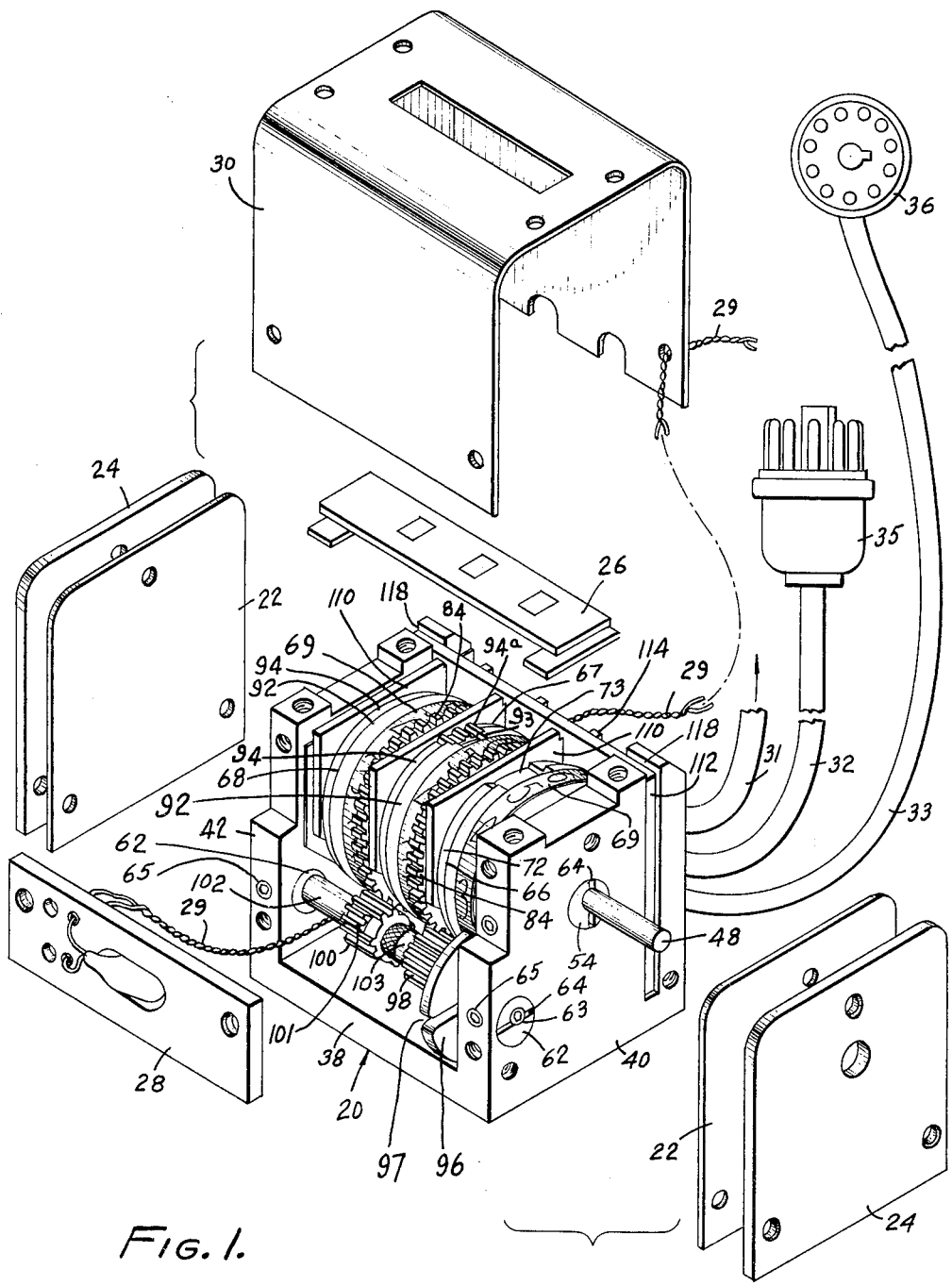
FIG. 1 is a partially exploded perspective view of a telemetering counter according to this invention.

With reference to FIG. 1, the basic telemetering counter unit 20 is provided with end gaskets 22, end plates 24, window 26, lamp board 28, lamp leads 29, cover 30, and three sets of ten-conductor cables 31, 32, and 33, with their associated cable plugs 35 and 36, for connection to the external circuitry. The cable plug for conductor cable 31 is not shown.

Figure 2:
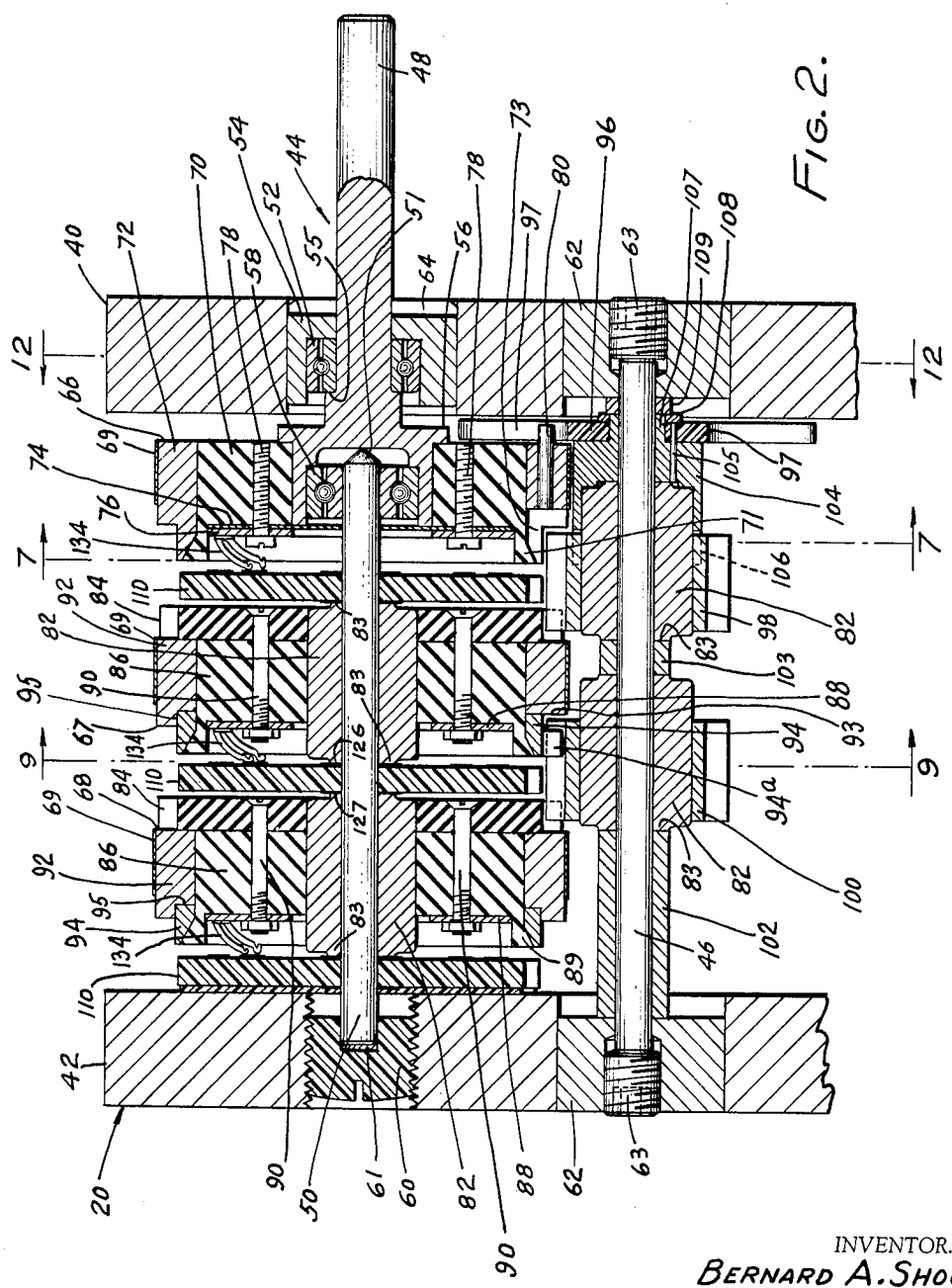
FIG. 2 is a cross-sectional view of the counter taken on line 2—2 of FIG. 1.

With reference to FIGS. 1 and 2, basic telemetering counter unit 20 comprises a base 38 that supports both counter wheels that carry wiper arms and that also supports printed circuit boards on which contacts are printed. The base 38 has end supports 40 and 42 which are integrally formed therewith. The end supports 40 and 42 and printed circuit boards 110 provide support means for the counter wheel compound shaft assembly 44 and the transfer gearing shaft 46. Compound shaft assembly 44 comprises an input shaft 48 and a counter wheel shaft 50. Input shaft 48 is supported by ball bearing 52 which is pressed into eccentric bearing unit 54 which, in turn, is suitably mounted in end support 40. This input shaft 48 is provided with a bearing-positioning shoulder 55 and a flanged hub 56 which is counterbored to receive the press-fitted thrust-bearing 58. Counter wheel shaft 50 is supported firmly in axially aligned apertures 116 of printed circuit plates 110. Counter wheel shaft 50 is supported at one end in the thrust bearing 58 and at the other end by a counterbored set screw or threaded plug 60 threaded into end support 42 to facilitate longitudinal adjustment of the compound shaft assembly 44. A resilient wear disc 61 is located in the oversized counterbore of this set screw 60.

Figure 12:
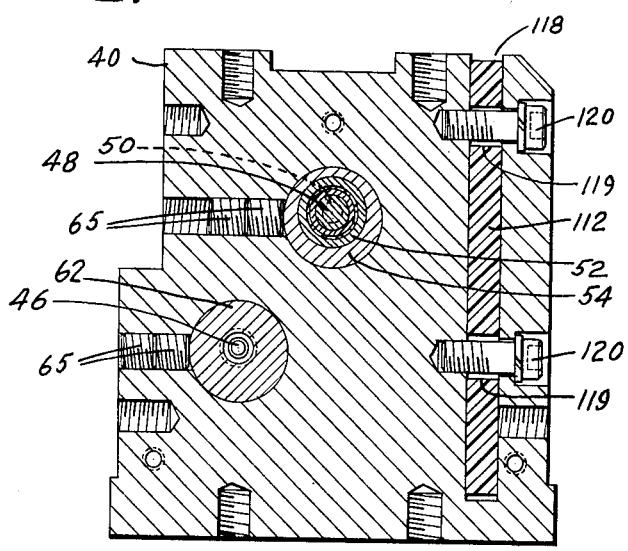
FIG. 12 is a cross-sectional view of an end support taken on the line 12—12 of FIG. 2.

Transfer-gearing shaft 46 is floatingly supported in two eccentric bearings 62 which are suitably housed in the end supports 40 and 42. These eccentric bearings 62 carry adjusting set screws 63 which are utilized to take out any end play of the shaft 46. As shown in FIG. 1, these eccentric bearings are provided with slots 64 so that they may be adjusted by means of a suitable tool for purposes more fully explained hereinafter. As shown in FIGS. 1 and 12, these eccentric bearings are secured into their adjusted positions by means of set screws 65. Two set screws may be used at each location for securely locking the eccentric bearings in their adjusted positions.

Counter wheels 66, 67 and 68 are supported by the shaft assembly 44. Input counter wheel 66 is secured to the counterbored flanged hub 56 of the input shaft 48 and rotates therewith. Counter wheels 67 and 68 are made interchangeable and they are free to rotate on shaft 50. All of the counter wheels carry the customary numeral or digital indicia bands 69 which, in this case, bear the digits from 0 to 9.

As indicated above, input counter wheel 66 is firmly fixed to input shaft 48. This wheel comprises a hub portion 70 which is pressed onto the flanged hub 56. This hub portion 70 carries a lock ring 72 which is provided with a cut out portion or notch 73. The locking ring 72 is held in place by pressing against a tapered shoulder on the hub portion 70. Hub portion 70 is counterbored to receive dust shield 74 and brush mounting ring 76. The later parts are secured in place by screws 78 which are threadably received by hub portion 70. An axial driving pin 80, i.e. one whose axis is parallel to the axis of the shafts 48 and 50, is secured in one face of the lock ring 72 and is positioned so that its axis is centrally located with respect to the cut out portion 73 of lock ring 72. It should be noted that input wheel 66 and its input shaft 48 represent a rugged and well supported driving unit.

Counter wheels 67 and 68 are identical in construction and a description of one will suffice for both. Wheel 67 comprises a counterbored hub portion 86 that is similar to hub portion 70 mentioned with respect to wheel 66. Here, however, hub portion 86 is pressed onto a bearing unit 82 which is formed with thrust projections 83 at its opposite ends to work against respective printed circuit plates 110. A spur or driven gear 84 is secured to the input face of the hub portion 86. A brush mounting ring 88 is mounted in the counterbore of hub portion 86 on the side opposite from the spur gear. The spur gear and brush mounting ring are held to the hub portion 86 by means of the machine screws and nuts 90. A lock ring 92 is mounted on the periphery of hub portion 86, being pressed into place. Adjacent thereto, a mutilated index ring gear 94 is also mounted on the periphery of the hub portion 86 and is pressed into place against the tapered shoulder 89. This ring gear is of the same dimensions and number of teeth as the spur gear except that all of the teeth have been removed to the root diameter with the exception of three indexing gear teeth as shown at 94a in FIG. 3. Lock ring 92 is provided with a notch 93 stepped at the outer end thereof to provide a shouldered recess portion for receiving the ends of the three teeth 94a. Lock ring 92 is also provided with a counterbore 95 which is slightly greater in diameter than the root diameter of the ring gear for receiving part of the annular body of the index ring gear 94. Due to this counterbore in the lock ring 92, the three teeth 94a fit snugly into the enlarged portion of shouldered notch 93. The remaining narrower portion of the notch 93 is of a certain dimension for purposes to be set forth hereinbelow. Thus, the index ring gear 94 is firmly located with respect to the locking ring 92 and no possibility of slippage or mislocation of the teeth 94a with respect to the remainder of the notch 93 exists.

The transfer gearing, as shown in FIGS. 2 and 5, comprises a Geneva wheel 96, and two mutilated pinions 98 and 100, all rotatably mounted on their common shaft 46. Pinions 98 and 100 are here formed of 16 teeth with alternate pairs of teeth foreshortened as indicated at 101, leaving alternate pairs of longer locking teeth 111. These pinions are press-fitted onto their bearing units 82 and are separated from each other and the eccentric bearings 62 in end support 40 and 42 by means of spacers 102, 103, and 109. The Geneva wheel 96 is mounted on and pinned to a collar 104 by means of axial pin 105. Collar 104 in turn is pressed onto the bearing unit 82 of pinion 98 and is provided with projections 106 which fit into the notches left by the foreshortened teeth of pinion 98 as at 101. As shown, the Geneva wheel 96 fits over the reduced diameter portion 107 of the collar 104. The pin 105 is then inserted and covered by the washer 108 which also fits on the portion 107. The collar portion 107 is then staked lightly to secure it into the washer 108 and the Geneva wheel is thereby prevented from moving laterally. Thus, the Geneva wheel is firmly and non-rotatably secured to the pinion 98. End spacer 109 is provided to accurately position the Geneva wheel with respect to the end support 40.

Figure 10:
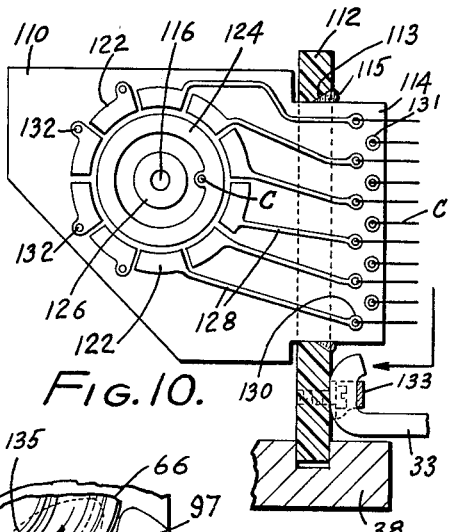
FIG. 10 is an elevation of one side of a printed circuit board used in the invention.

In order to separate the counter wheels and so provide a support for certain of the telemetering components, partitions in the nature of printed circuit boards 110 are provided as shown in FIGS. 1, 2, and 4. These printed circuit boards are made of epoxy resin or other similar insulating material and are supported by a panel member 112 of similar material. The panel member is provided, in this case, with three parallel chamfered slots 113 as shown in FIG. 10 which are of a dimension suitable to just accept the printed circuit board tabs 114. These printed circuit boards and panel member are jig-assembled assuring proper spacing of the printed circuit boards from each other and exact parallelism of the circuit board shaft apertures 116 with respect to the panel member. When the printed circuit boards and panel member are properly located and aligned in the jig, epoxy resin or other similar plastic cement is flowed into the chamfered slots in the panel member as at 115, FIG. 10, and cured, thus securely anchoring the circuit boards to the panel member and, in effect, making this construction of a rugged, monolithic character.

With reference to FIG. 1 and 12, end supports 40 and 42 are provided with clamping slots 118 that are precision milled or otherwise formed in those parts. Panel member 112 is provided with oversize holes 119 through which pass the end support clamping screws 120. The oversize holes 119 allow the panel member to be shifted slightly so as to facilitate its proper positioning. After being precisely located, as will be more fully explained later, the clamping screws 120 are tightened and the monolithic structure of circuit boards and panel members are held firmly in place.

Figure 11:
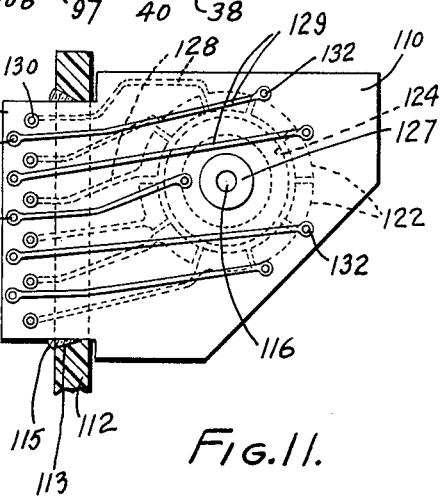
FIG. 11 is an elevation of the other side of the printed circuit board shown in FIG. 10.

Printed circuit boards 110 are provided on one side with outer rings of commutator segments or contacts 122, in this case ten in number, as shown in FIGS. 10 and 11. An inner continuously conducting ring 124 is also formed concentric with the outer ring of commutator segments 122. A still further and smaller concentric bearing ring or surface 126 is formed around and adjacent the shaft aperture 116. Circuit connectors 128 are formed to connect six of the commutator segments to the inner row of terminal connectors 130. On the other side of the printed circuit boards, circuit connectors 129 are formed to connect the remaining four commutator segments and the conducting ring 124 to the outer row 131 of terminal connectors. A small concentric bearing ring or surface 127 is also formed thereon. This bearing surface 127 corresponds to the similar surface 126 formed on the first side.

Conducting pins 132 afford the necessary electrical connection between their respective commutator segments 122 and the conducting ring 124 on one side to the printed circuit connectors 129 on the other side. Thus all leads are brought out conveniently to one accessible place. The conductors of cable 33 may be soldered or otherwise suitably secured to these terminal connectors. Cable 33 is shown as being held to the panel member by means of the customary cable clamp 133. Similarly, cables 31 and 32 may be fastened to their respective printed circuit boards. It should be noted that the printed circuits on both sides, usually initially formed from the copper plating on the boards, are nickel and then rhodium plated for maximum wear.

Figure 7:
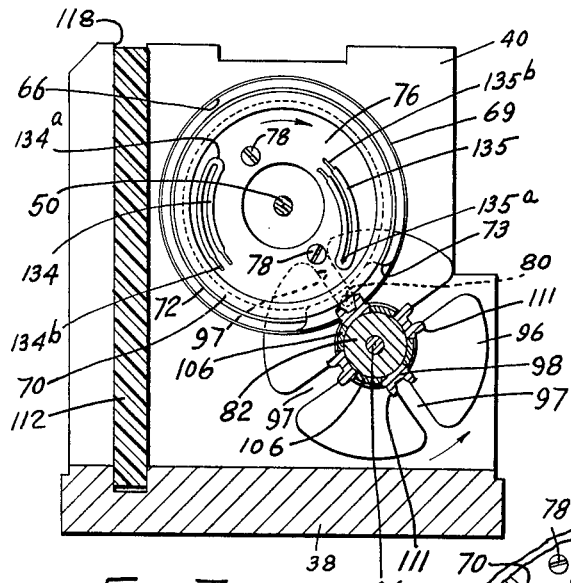
FIG. 7 is a cross-sectional elevation taken on the line 7—7 of FIG. 2.
Figure 9:
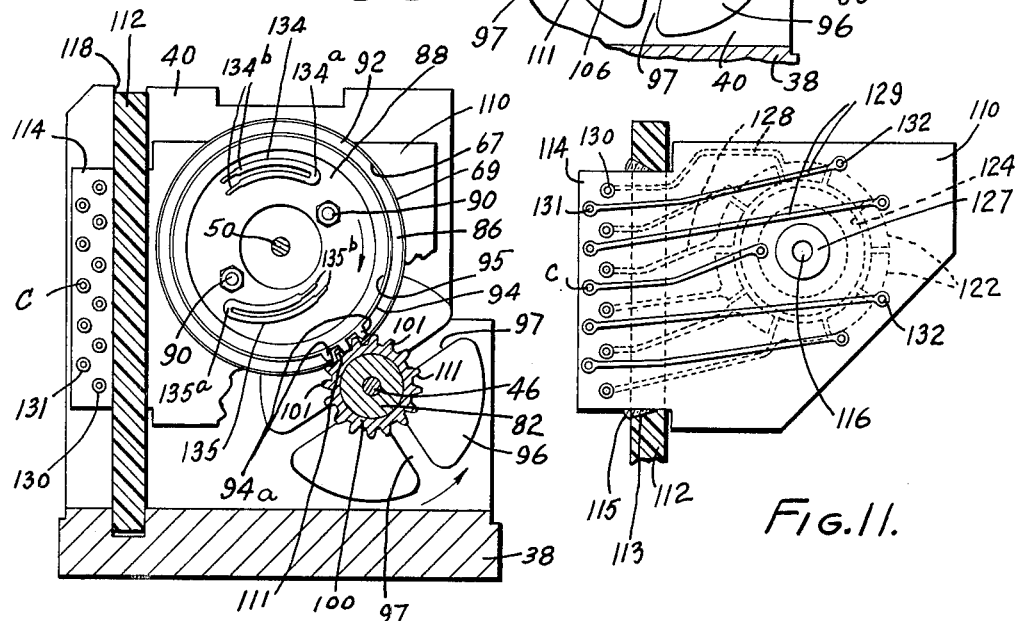
FIG. 9 is a cross-sectional elevation taken on the line 9—9 of FIG. 2.

The brush mounting rings 76 and 88 are identical and comprise an apertured metallic disc secured to their respective hub portions 70 and 86 as shown in FIGS. 2, 7, and 9. These brush mounting rings carry two spring metallic brushes 134 and 135. The looped ends 134a and 135a of these brushes are suitably secured to the metallic discs by solder, spot welding, or other suitable means. The bifurcated ends 134b and 135b are so shaped and arranged as to press against their mating commutator segments 122 and continuous ring 124 over substantial lengths of the looped ends. As shown, brush 134 contacts the continuous ring 124. Thus the metallic discs 76 and 88 with their brushes 134 and 135 act as a bridging connector to conduct electric current from the continuous ring 124 to the various commutator segments in turn. By this arrangement, the cumbersome and unsatisfactory brushes and slip rings of the prior art are eliminated.

In practice either shorting or non-shorting brushes may be employed. With brushes of the shorting type, as a brush moves from one contact position to the next, it contacts the new contact before breaking contact with the old. But with brushes of the non-shorting type, the brush breaks contact with the old contact before contacting the new contact.

Figure 8:
FIG. 8 is a partial detail view of part of the transfer gearing.

The mode of operation will now be explained. The Geneva wheel 96 is provided with four radial slots 97, dimensioned so as to receive the driving pin 80. Lock ring 72 turns in the space 101 provided by the foreshortened teeth and is so dimensioned that the long locking teeth 111 of the pinion ride on the periphery of the lock ring and thus prevent the pinion 98 from turning. With reference to FIGS. 7 and 8, as the pin 80 engages a slot 97 in the Geneva wheel, it commences to turn that wheel and its associated pinion gear 98, thus initiating the transfer movement from the impact wheel to the next higher order counter wheel. Since the driving pin 80 is centrally located with respect to the cut out portion 73 in the locking ring 72, the cut out portion 73 is now adjacent to the longer locking teeth 111 on the pinion 98. In a single pass the driving pin turns the pinion 98 one-fourth of a revolution after which the pinion again becomes locked in position. In turning its one-fourth of a revolution, pinion 98 meshes with the spur gear 84 carried by the counter wheel 67. Since the pinion 98 has 16 teeth and the spur gear has 40 teeth, this one-fourth rotation of the pinion 98 turns counter wheel 67 one-tenth of a revolution. Thus wheel 67 makes one revolution each time wheel 66 makes ten revolutions in the same direction.

Similarly, pinion 100 is normally locked in place by the lock ring 92 on the counter wheel 67. As this wheel is advanced by one-tenth of a revolution corresponding to the complete revolution of input wheel 66, ring gear 94 meshes its three teeth 94a with the longer locking teeth 111 of pinion 100. Since teeth 94a and notch 93 are aligned with each other, the longer locking teeth 111 of pinion 100 enter the narrower portion of the notch 93 and allow pinion 100 to move one-fourth of a revolution after which it becomes locked by the lock ring 92. During its one-fourth revolution, pinion 100 turns wheel 68 one-tenth of a revolution due to the meshing of the pinion 100 with the 40-tooth spur gear 84 carried by counter wheel 68. Thus the input wheel 66 is free to rotate in response to the rotation of its drive shaft 48 while wheels 67 and 68 are normally locked in place except when they are allowed to turn one-tenth of a revolution in response to a complete revolution of the preceding, lower-order counter wheel.

The Geneva wheel 96, which may be of a semi-resilient material, such as nylon, in initiating the transfer movement, provides shockless input thereto. As shown in FIG. 8, as the driving pin 80 enters and leaves the radial slots 97 at an angle closely approaching a tangent to the wheel 66, this results in a gentle pick-up of the Geneva wheel. This Geneva wheel is then driven at its maximum velocity at the point where the slot 97 is radial to the center of rotation of the wheel 66 and the driving pin 80 has entered the slot 97 as far as possible as shown in FIG. 7. At this point, the driving pin begins to move out of the slot 97 and, since the angle of the slot to the direction of rotation of the driving pin gradually becomes less acute, the Geneva wheel decelerates in the same gradual manner as it accelerated at the initiation of the transfer movement.

It should be noted here that the pinions 98 and 100 are interchangeable, and are economically constructed from sixteen-tooth pinion wire. The alternate pairs of teeth are foreshortened by two simple slotting cuts across the face of the blank, each cut being at right angles to the other. The distance between two of the longer locking teeth across one of the pinion slots 101 are such that these two teeth ride on the periphery of the lock rings 72 and 92, as shown in FIG. 8, so as to provide the necessary locking action to the pinions and to the second and higher order counter wheels.

In assembling my high speed digital telemetering counter, the input wheel 66, fully assembly, is placed in the end support 40 with its eccentric bearing unit 54 and its ball bearing 58. The eccentric bearing 54 is placed with its least eccentricity in the vertical position, as shown, and lightly secured in place with its set screws 65. The input wheel assembly is adjusted to the right, as in FIG. 2, until the driving pin 80 just clears the inner face of end support 40. The length of this pin acts as a gauge so as to leave ample clearance between counter wheel 66 and the end plate 40 for the later insertion of Geneva wheel 96. The monolithic assembly of printed circuit boards 110 and panel board 112 is then placed in the clamping slots 118 of the end supports 40 and 42 and lightly clamped in place by means of the clamping screws 120. Shaft 50 is then inserted through the apertures 116 in the printed circuit boards until by vertical adjustment of the panel board 112 in the clamping slots 118 and by slight horizontal adjustments afforded by the eccentric bearing unit 54, the shaft 50 properly enters the ball bearing 58 and is held without binding in the counterbore of the set screw or threaded plug 60. With this adjustment completed, clamping screws 120 and eccentric bearing set screws 65 are tightened. Set screw 60 and shaft 50 are then removed. Holding counter wheels 68 and 67 successively in position, shaft 50 is reinserted until its pointed end engages the inner end 51 of the counterbore of the flanged hub 56 of the input shaft 48. Set screw 60 with its wear disc 61 is then inserted into end support 42 and adjusted against the end of the shaft 50 until there is no noticeable play in endwise movement of the input shaft 48 and counter wheel 66. It can now be seen that the thrust projections 83 on the bearing units 82 bear against the printed circuit bearing surfaces 126 and 127 at the respective ends of counter wheel hubs. Due to the close dimensional control used in the spacing of the printed circuit boards, depth of plating for the printed circuits, and length of the bearing units 82, counter wheels 67 and 68 are rotatably held on shaft 50 with very little axial play.

The transfer gearing is easily installed by putting an eccentric bearing 62 with its set screw 63 in end support 40. An eccentric bearing 62 without its set screw 63 is placed in the left end support 42. Shaft 46 is then inserted from the left and is successively passed through the long spacer 102, pinion 100, short spacer 103, pinion 98, Geneva wheel collar 104 and end spacer 109 into the shaft aperture in the eccentric bearing 62 installed in the end support 40. Set screw 63 is then inserted into the left eccentric bearing 62 in end support 42. By adjusting the eccentricity of the eccentric bearings by means of their slots 64 and the endwise location of eccentric bearing 62 in end support 40, the meshing of the pinions with their respective spur gears 84 on the counter wheels 67 and 68 can be closely controlled to eliminate all unnecessary backlash and the proper location of the Geneva wheel 96 with respect to the inner face of end support 40 can be accomplished. Set screws 65 can then be tightened to secure the eccentric bearings 62 in place. End set screws 63 can be adjusted as desired to remove all unecessary end play from the shaft 46.

The mode of construction described above assures not only the end result of a high speed digital telemetering counter which may be used at higher speeds than those attained in the prior art, but also a counter, which by substantially eliminating all backlash and play presents a precision instrument capable of close and fine operation. Another feature presented by this type of construction is the ease in replacing worn or defective parts since so many of the parts are interchangeable. Other features include the ease of occasional adjustment of the transfer gearing so as to eliminate any backlash that may develop as a result of wear through continued high speed use.

While the embodiment of my invention, so far, has been described as a telemetering counter wherein the input wheel rotates freely and the succeeding or higher order wheels rotate only in designed fractions of a revolution relative to a complete rotation of the preceding counter wheel, attention should be invited to the fact that by a simple adjustment, the counter may be converted to a registering or digital indicating double-pole stepping switch. To accomplish this conversion, shaft 46 is drawn out to the left and pinions 100, 98, the spacers 102, 103, 109, and the Geneva wheel unit are removed. Geneva unit 140, shown in FIG. 6, is then substituted in place of the pinions 100 and 98 and the spacer 103. Geneva wheel unit 140 comprises a compound pinion 141 made from a length of sixteen-tooth pinion wire, the standard Geneva wheel collar 104, and the Geneva wheel 96. Pinion 141 is made to a length equal to that of the pinion 100, spacer 103 and pinion 98. The right hand end of this compound pinion 141 is made similarly to that of pinion 98 with alternate pairs of teeth foreshortened, leaving alternate pairs of long locking teeth 111 with spaces 101, thus retaining the locking function in connection with the lock ring 72 of the first or input counter wheel 66. The diameter of pinion 141 is reduced, as at 142, so as to clear the locking ring 92 and index ring gear 94 carried by second counter wheel 67. The left end of pinion 141 which constitutes transfer pinion 143 is made of a length sufficient to mesh with spur gear 84 on the third counter wheel 68 but short enough to provide proper clearance for the index ring gear 94 and locking ring 92 carried by the second counter wheel 67. Compond pinion 141 may be mounted on two standard bearing units 82, one inserted from each end, or a longer integral bearing unit (not shown) may be specially provided. Thus, when shaft 46 is reinserted with spacer 102, Geneva wheel unit 140 and spacer 109, the Geneva wheel 96 is driven by the pin 80, and the right hand pinion portion of compound pinion 141 with its locking teeth 111 coacting with the locking ring 72 on counter wheel 66 also meshes with spur gear 84 on counter wheel 67. The left end pinion 143 meshes with the spur gear 84 on the third counter wheel 67. As the Geneva wheel is rotated, counter wheels 67 and 68 are rotated as a unit for one-tenth of a revolution. It follows, then, that as the two counter wheels move in unison, their respective brushes 134 and 135 also move together, making contact in turn with the commutator segments 122 and the continuous conducting rings 124. Thus, the two counter wheels with their brushes and printed circuit boards constitute a double pole stepping switch that is rotated one-tenth of a revolution for each complete rotation of the input wheel. When making the conversion to the stepping switch as above described, counter wheels 67 and 68 would preferably be aligned so that the same number on each wheel would appear in the window 26. The number thus showing would indicate the position of the brushes and the commutator segments being contacted thereby.

Figure 13:
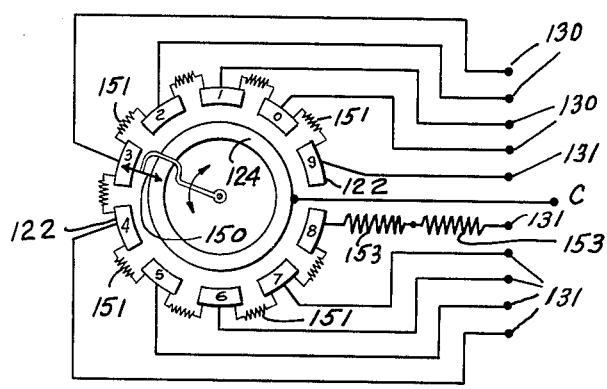
FIG. 13 is a schematic wiring diagram of one telemetering counter unit.
Figure 14:
FIG. 14 is a schematic wiring diagram illustrating another alternative telemetering circuit.

FIGS. 13 and 14 illustrate two possible forms of circuitry which may be established with my invention. FIG. 13 illustrates the circuitry currently in use for telemetering as shown on the printed circuit boards 110 in FIGS. 4, 10, and 11. The individual leads from the commutator segments 122 are brought out to the double row of terminal connections 130 and 131 located on the printed circuit board tabs 114 which project through the panel member 112. A single common lead C is brought out to the same location from the continuous conducting ring 124. The bridging conductor or connector 150 represents the combination of the brushes 134 and 135 carried by the metallic or otherwise conducting brush mounting rings 76 and 88. As the counter wheel moves, the brushes are carried with it and make contact between the conducting ring 124 and successive commutator segments. These circuits, of course, can be used as may be desired either for remote indication of the numerals shown through the window or for other purposes of indication or control. It should be understood that the schematic wiring diagram in FIG. 13 represents only one printed circuit board and the bridging connector brushes of one counter wheel. The other printed circuit boards circuitries are here shown as identical and may be interconnected as desired, such as connecting all connectors C to a common source of voltage.

Figure 15:
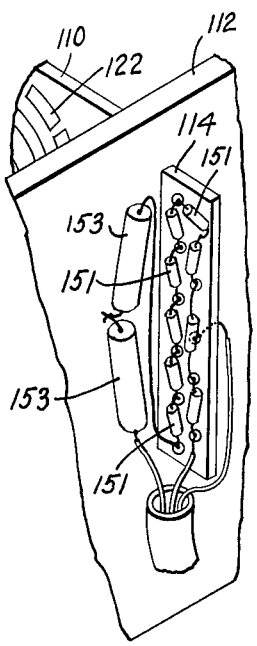
FIG. 15 is a partial perspective view illustrating a modification of the invention.

FIG. 14 illustrates a modification where impedance components 151 are interconnected between the commutator segments 122 for introducing such impedance values in discrete steps into the telemetering circuits. In this even such impedance values could be provided in the form of miniature resistors (as shown), miniature chokes or capacitors connected between the terminal connectors on the tabs 114 of the printed circuit boards 110, as shown in FIG. 15. Additional physically larger impedance units can be used, such as the series impedances 153, depending on the circuitry desired. While these additional impedance units 153 are shown as being detached in FIG. 15, for purposes of illustration, they are actually fastened to the tab 114 on the panel member 112, partly covering the smaller units 151. In other circuit arrangements, the impedance values, if desired, could be suitably introduced at the remote indicating or controlling location.

It is thus seen from the foregoing description that my invention comprises a small, extremely compact, reversible, high speed digital telemetering counter that is susceptible of precise adjustment and embodies a type of construction which assures precision location of parts and elimination of backlash and play in the moving parts which usually contribute to inaccuracy of registration in the counting functions, undue wear, and troublesome vibration. It can also be seen that my invention provides means for the facile removal and replacement of worn or otherwise defective parts and means for rapidly converting the unit from a high speed digital telemetering counter with a mechanical input drive to a high speed, digital indicating or controlling double pole stepping switch.

While the embodiment of my invention has been shown with but three counter wheels and a counting radix of ten, it should be understood that a different number of counter wheels having a different counting radix could be supplied without departing from the spirit of the invention. The conversion to a stepping switch with any number of poles, depending upon the number of counter wheel units employed, could also be accomplished within the scope of the invention as described. Other changes could be made in the printed circuit boards, say, which might be apparent to those skilled in the art and which would yet fall within the scope of the appended claims. In view of these possible changes, I do not intend to be limited by the foregoing description which is illustrative only of one embodiment of my invention.

I claim:

1. In a high speed digital telemetering counter, in combination:
    a basic unit comprising a base and two end supports projecting substantially perpendicular thereto;
    a plurality of rotatable counter wheels bearing peripherally arranged digital indicia, including a first low-order freely rotating input counter wheel and one or more higher-order succeeding counter wheels, said counter wheels being mechanically interconnected by transfer gear means;
    a panel member of insulating material secured to said two end supports at rear edges of said supports;
    a plurality of circuit board partition members secured to said panel member supported by said end supports, one of each of said circuit boards being interposed between adjacent counter wheels, said circuit boards bearing telemetering contacts and connection means thereon for connecting said contacts to an external circuitry;
    shaft means supported by said end supports and said partition members for mounting said counter wheels and said transfer gear means; and
    bridging connector brush means carried by each counter wheel for contacting said telemetering contacts in sequence as said counter wheel is rotated, said basic unit including a monolithic structure comprising said circuit boards and said panel member, said panel member having a plurality of slots, said slots being chamfered on one side of said panel member, integral tabs on said circuit boards inserted through said slots from the other side of said panel member, and insulating material inserted in said chamfered slots surrounding said circuit board tabs and cementing said circuit boards to said panel member in fixedly secured relation.

2. In a high speed digital telemetering counter, the combination as claimed in claim 1, wherein said plurality of circuit boards are jig assembled and fixedly secured substantially normal to a panel member whereby the combination of said plurality of circuit boards and said panel member constitute said monolithic structure insuring dimensional accuracy between adjacent circuit boards.

3. In a high speed digital telemetering counter, the combination as claimed in claim 1, wherein said connection means comprises a row of terminal connectors along one edge of said circuit boards and circuit conductors formed between said telemetering contacts and said row of terminal connectors, said row of terminal connectors being disposed on one side of said basic unit whereby connection between the external circuitry and the telemetering contacts on each board may be accomplished with facility.

4. In a high speed digital telemetering counter, in combination:
    a basic unit consisting of a base and two end supports extending substantially normally of said base, said end supports being provided with longitudinal clamping slots adjacent one edge, said clamping slots being disposed substantially perpendicular to said base;
    a plurality of rotatable counter wheels bearing peripherally arranged numerals including a first low-order freely rotating input wheel and one or more higher-order succeeding counter wheels, said counter wheels being interconnected by transfer gear means;
    shaft means for mounting said counter wheels and said transfer gear means; and
    circuit board partition members separating adjacent counter wheels, said circuit boards having circuit telemetering contacts and connectors formed thereon for connection to external circuitry and apertures for the passage of said counter wheel shaft means therethrough, said circuit boards being disposed substantially parallel to said end supports and rigidly supported along one edge by a panel member,
    said panel member rigidly supporting all of said circuit boards in parallel relationship with said shaft apertures in alignment; and
    means to adjustably clamp said panel member in said end support clamping slots whereby said circuit boards may be aligned substantially coaxially with the said bearing means for said counter wheel shaft means.

5. In a high speed digital telemetering counter, in combination:
    a basic unit comprising a base and two end supports projecting substantially perpendicular thereto;
    a plurality of rotatable counter wheels, including a first low-order freely rotating input counter wheel and a higher-order succeeding counter wheel, said counter wheels being interconnected by transfer gear means;
    at least one printed circuit board partition member adjustably supported by said end supports, said printed circuit board being interposed between adjacent counter wheels and bearing telemetering contacts and connection means printed thereon;
    shaft means adjustably supported by said end supports for mounting said counter wheels and transfer gear means;
    bridging conductor means carried by said low-order counter wheel for contacting said telemetering contacts in sequence as said counter wheels rotate;
    and a panel member carried by said end supports of said basic unit, said printed circuit board being fixedly secured in substantially perpendicular relationship to said panel member, whereby the combination of said printed circuit board and said panel member constitutes a monolithic structure, insuring dimensional accuracy.

6. In a high speed digital counter, in combination:
    a basic unit comprising a base and two rigidly connected end supports projecting substantially perpendicularly to said base;
    a first shaft means;
    a plurality of rotatable counter wheels mounted on said first shaft means and including a first low-order freely rotating injut counter wheel and a plurality of higher-order succeeding counter wheels, said counter wheels being interconnected by transfer gear means;
    circuit board partition members disposed between adjacent counter wheels and bearing electrical contacts and connector means thereon;
    a second shaft means carrying said transfer gear means;
    adjustable bearing means mounting the ends of said second shaft means in said end supports for adjusting said second shaft means radially with respect to said first shaft means;
    bridging conductor means carried by said counter wheels for contacting said contacts on the respective circuit board partition members; and
    a panel member carried by said end supports of said basic unit, said panel member having slots therein rigidly receiving edge portions of said circuit board partition members and forming a monolithic structure of said circuit board partition members and panel member, thereby accurately positioning said circuit boards between said counter wheels, said adjustment means for said first shaft means providing for precise and accurate positioning of said counter wheels and their bridging conductor means with respect to the contacts of said circuit boards.

7. A combination as in claim 6 wherein said end supports are provided with clamping slots and the ends of said panel member are rigidly clamped in said slots, whereby said partition members are rigidly and precisely positioned with respect to said base and end members.

References Cited by the Examiner

UNITED STATES PATENTS

| | | | |
|---|---|---|---|
| 717,924 | 1/03 | Reid | 308—62 |
| 825,432 | 7/06 | Tyler | 235—139 |
| 1,919,493 | 7/33 | Zubaty | 235—139 |
| 2,253,721 | 4/41 | Meer | 235—117 |
| 2,344,254 | 3/44 | Leathers et al. | 235—6 |
| 2,483,359 | 9/49 | Bliss | 235—139 |
| 2,733,008 | 1/56 | D'Andrea et al. | 235—92 |
| 2,774,063 | 12/56 | Grinstead et al. | 235—154 |

OTHER REFERENCES

"A Bi-Directional Pulse Totalizer for Control and Telemetry," by H. D. Wright, from part I, 1956 IRE Convention Record, pages 92–95.

MALCOLM A. MORRISON, *Primary Examiner.*

LEO SMILOW, DARYL W. COOK, WALTER W. BURNS, JR., ABRAHAM BERLIN, *Examiners.*